H. B. SIMPSON AND D. HOOD.
DIRIGIBLE HEADLIGHT.
APPLICATION FILED JAN. 18, 1919.
1,324,852.
Patented Dec. 16, 1919.
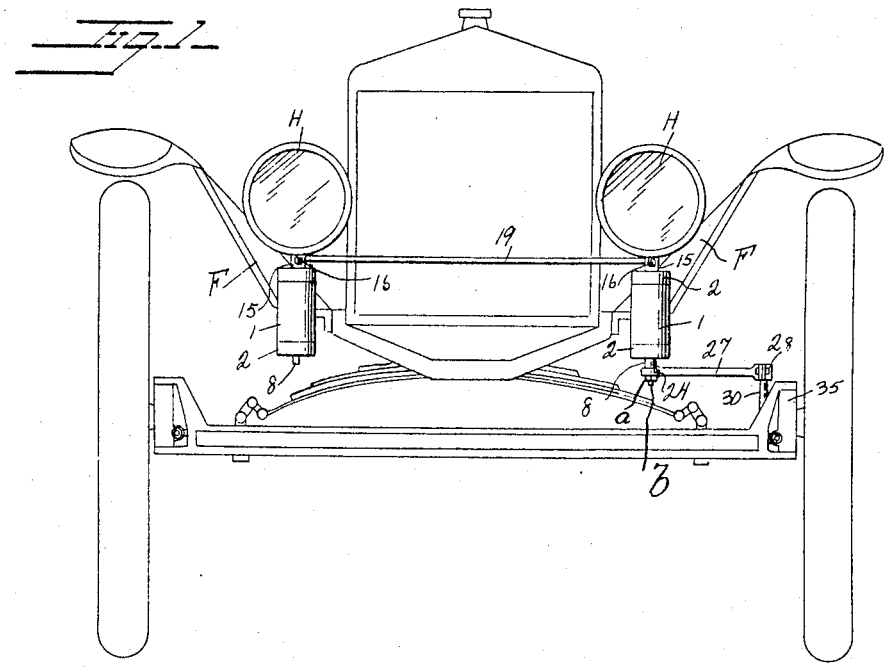
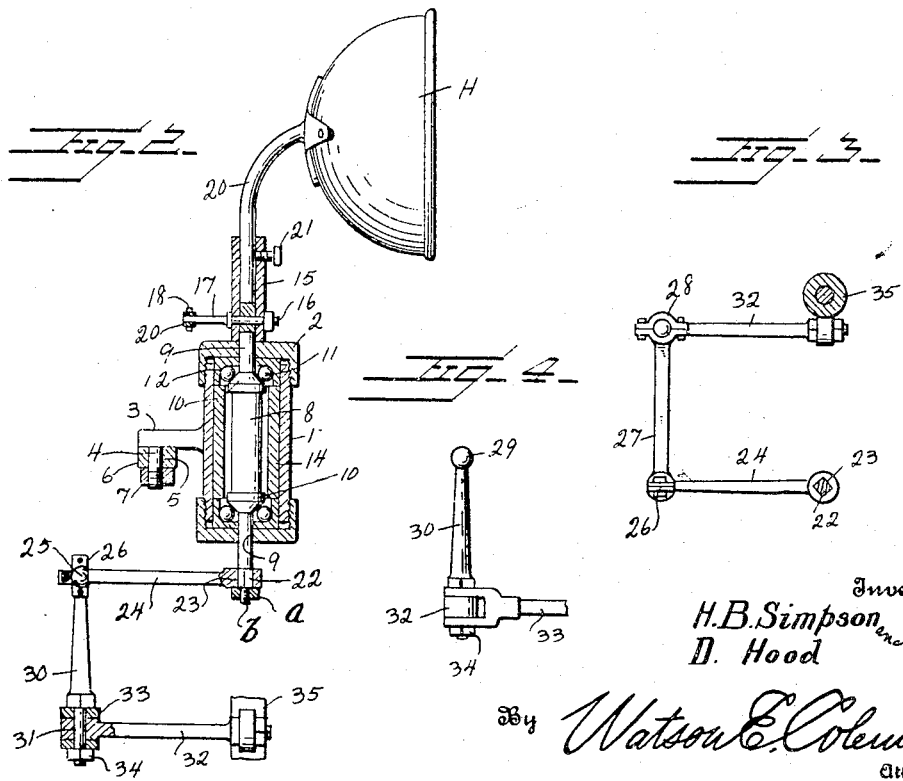

UNITED STATES PATENT OFFICE.

HALL B. SIMPSON AND DEWITT HOOD, OF WESTMINSTER, TEXAS.

DIRIGIBLE HEADLIGHT.

1,324,852.      Specification of Letters Patent.     Patented Dec. 16, 1919.

Application filed January 18, 1919. Serial No. 271,803.

*To all whom it may concern:*

Be it known that we, HALL B. SIMPSON and DEWITT HOOD, citizens of the United States, residing at Westminster, in the county of Collin and State of Texas, have invented certain new and useful Improvements in Dirigible Headlights, of which the following is a specification, reference being had to the accompanying drawings.

This invention relates to certain improvements in dirigible headlights, and has relation more particularly to a device of this general character especially designed and adapted for use in connection with an automobile, and it is an object of the invention to provide a device of this general character having novel and improved means whereby the headlight will be caused to turn in unison with the steering wheels and in the same general direction so that the desired illumination of the roadway in advance of the automobile may be had during a turn.

It is also an object of the invention to provide a novel and improved means whereby the headlights are supported by the automobile or other vehicle for turning movement about vertical axes, together with means for causing said headlights to turn in unison and in the same general direction, and wherein means are provided for causing the desired swinging or rotation of the headlights in unison with and in the same general direction as the steering wheels of the automobile or the like.

It is also an object of the invention to provide a dirigible headlight with novel and improved means operated from the spindle arm of a steering wheel for causing the headlight to move substantially in unison with and in the same general direction as the steering wheel, and wherein said means compensate for the vibration of the vehicle body and compensate for any lost motion in the steering gear.

The invention consists in the details of construction and in the combination and arrangement of the several parts of our improved dirigible headlight whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a view in front elevation illustrating dirigible headlights and operating means therefor arranged in accordance with an embodiment of our invention;

Fig. 2 is an enlarged fragmentary view partly in side elevation and partly in section illustrating the mounting of a dirigible headlight and the operating means therefor as herein disclosed;

Fig. 3 is a fragmentary view partly in top plan and partly in section illustrating the operative connection between a spindle arm and the headlight; and Fig. 4 is a fragmentary view in elevation illustrating one of the arms comprised in the operating means, and which is engaged with the spindle arm.

Our invention as herein disclosed is primarily adapted for use in connection with the well known Ford automobile, and as disclosed in the accompanying drawings each of the fenders F of the car supports a cylindrical tubular member 1 vertically disposed and having its opposite end portions closed by the removable caps 2. Radiating from the member 1 substantially midway the length thereof is an arm 3 having depending from its free end portion a shank 4, which is adapted to be inserted through an opening 5 in a fender brace 6. The opening 5 is the same opening which is provided for in the Ford car, and which coacts with the lamp post which forms part of the original Ford car. 7 denotes a clamping bolt or the like coacting with the shank 5 whereby the member 1 may be effectively maintained in applied position.

8 denotes a shaft disposed axially through the member 1 and having its opposite end portions disposed through suitable openings 9 in the caps 2, and which shaft terminates outwardly of such caps. The shaft 8 within the member 1 is provided with the cones 10 with which coact the anti-friction members 11, herein shown as ball bearings, arranged within the cups 12 positioned within the member 1 at the opposite end portions thereof. Also arranged within the member 1 and positioned between the cups 12 is a spacing sleeve 14. In view of the foregoing, it will be at once evident that the shaft 8 is capable of rotation with a minimum of frictional resistance.

The upper extended portion of the shaft 8 is disposed within the lower end portion of the vertically directed coupling sleeve 15, and said sleeve and shaft 8 are connected one to the other by the shank 16.

The shank 16 is provided with an extension 17, to the outer end portion of which is pivotally engaged, as at 18, an end portion of a connecting rod 19. The opposite end portion of the rod 19 is similarly engaged with a corresponding extension 17 embodied in the structure concomitant with the second member 1 so that the shafts 8 coacting with both of the members 1 will be caused to rotate in unison and in the same general direction.

The lower end portion of a lamp bracket 20 is inserted within the upper end portion of the sleeve 15 and is locked therein through the medium of the binding screw 21 threaded through the sleeve 15. The upper end portion of the post 20 has clamped or otherwise secured thereto the headlight or lamp H of a conventional type.

The lower extended portion of one of the shafts 8 has its free extremity 22 angular in cross section and which is disposed within a similarly formed opening 23 in the end portion of a horizontally and rearwardly disposed arm 24. The arm 24 is held to the shaft 8 through the medium of the clamping nut $a$ threaded upon an extension $b$ of the shaft 8.

The outer or free end portion of the arm 24 is provided with a ball 25 adapted to be engaged within a socket 26 carried by an end portion of a horizontally arranged and laterally disposed arm 27. The ball 25 and socket 26 afford a universal connection between the arms 24 and 27. The socket 26 comprises separable sections so that the ball 25 may be arranged within the socket 26. The opposite end portion of the arm 27 is provided with a second socket 28 and which receives a ball 29 carried by the upper end portion of the vertically disposed arm 30. The lower end portion of the arm 30 is provided with a depending shank 31 which pivotally connects the spindle arm 32 and the spindle connecting or steering rod 33. The shank 31 has coacting therewith in a conventional manner the nut 34.

The spindle arm 32 as herein disclosed is of the type employed on the well known Ford automobile, and which is carried by the spindle body bushing 35.

As the spindle arm 24 swings during a steering operation the arms 30, 27, and 24 will result in rotation of the shaft 8 so that the headlight or lamp H will be swung in unison with and in the same general direction as the steering wheels, so that the roadway in advance of the automobile will be effectively illuminated during a turn. The universal joints as afforded by the ball 25 and socket 26 and the socket 28 and the ball 29 will readily compensate for the vibration of the vehicle body, and also compensate for any lost motion which may be in the steering gear so that normally the headlights or lamps H will be disposed substantially straight ahead.

From the foregoing description, it is thought to be obvious that a dirigible headlight constructed in accordance with our invention is particularly well adapted for use by reason of the convenience and facility with which it may be assembled and operated, and it will also be obvious that our invention is susceptible of some change and modification without departing from the principles and spirit thereof, and for this reason we do not wish to be understood as limiting ourselves to the precise arrangement and formation of the several parts herein shown in carrying out our invention in practice except as hereinafter claimed.

We claim:

The combination with a vehicle steering mechanism, a pair of vertically disposed shafts supported by the vehicle body, a sleeve disposed over the upper end portion of each of the shafts, a member connecting said sleeve and shaft and extending beyond the sleeve, a rod pivotally engaged with each of said extensions whereby both of the shafts are caused to rotate in unison and in the same general direction, lamps secured to the sleeves, and means operatively engaged with the vehicle steering mechanism for rotating the shafts.

In testimony whereof we hereunto affix our signatures in the presence of two witnesses.

HALL B. SIMPSON.
DEWITT HOOD.

Witnesses:
T. J. ROADY,
W. B. BAKER.